United States Patent [19]

Yang et al.

[11] 4,081,512

[45] Mar. 28, 1978

[54] NITRITE-IMPREGNATED CARBON FOR THE ADSORPTION RECOVERY OF VCM

[75] Inventors: Kang Yang; James D. Reedy; Robert C. Lindberg, all of Ponca City, Okla.

[73] Assignee: Continental Oil Company, Ponca City, Okla.

[21] Appl. No.: 748,010

[22] Filed: Dec. 9, 1976

[51] Int. Cl.$^2$ .................. B01D 53/34; B01D 53/02
[52] U.S. Cl. ............................. 423/240; 423/245; 55/59; 55/71; 55/74; 260/654 S; 260/656 R
[58] Field of Search ................ 423/240, 241, 245; 55/59, 71, 74; 260/654 S, 656 R

[56] References Cited

U.S. PATENT DOCUMENTS

| 3,796,023 | 3/1974 | Raduly | 55/71 X |
| 3,984,218 | 10/1976 | Patel et al. | 55/71 X |

Primary Examiner—Earl C. Thomas
Attorney, Agent, or Firm—Cortlan R. Schupbach, Jr.

[57] ABSTRACT

The impregnation of carbon with nitrite compounds drastically reduces the formation of acetylene and carbon dioxide in the adsorptive recovery of vinyl chloride monomer from air-contaminated streams containing such monomer.

5 Claims, No Drawings

NITRITE-IMPREGNATED CARBON FOR THE ADSORPTION RECOVERY OF VCM

The present invention deals with means of preventing the formation of detrimental compounds during the adsorptive recovery of vinyl chloride monomer from air-contaminated streams. More specifically, the instant invention relates to a method for preventing such formation by impregnating carbon with nitrite compounds.

In early 1974 vinyl chloride monomer (VCM) was declared a potential carcinogen as a result of illness by many workers of the B. F. Goodrich Company. Subsequently, the carcinoginic nature of VCM has been varified and a number of government regulations published to reduce personnel exposure. These regulations are currently being inacted in all countries of the world. Many methods of removing this potential carcinogen from being vented to the environment have been proposed. Among these are incineration and adsorption upon carbon. Incineration is not highly regarded for several reasons, among them being a formation of hydrochloric acid and the subsequent necessity for removing this acid from vent gases together with the corrosive nature of the acid form.

A more feasible method has been the adsorption of VCM on carbon until the carbon bed is completely loaded with VCM, followed by steam stripping the carbon or otherwise regenerating the carbon to recover and recycle the vinyl chloride monomer. This method currently appears to have great favor and to be a method which will be in widespread use.

Active carbon has often been used to recover VCM from various discharge streams resulting from the production of polyvinylchloride. These methods are described, for example, in U.S. Pat. No. 3,796,023, German Offenlegungsschrift No. 2,148,954, and French Demande No. 2,156,496. However, according to the instant invention, it has now been discovered that the mere adsorption of VCM on carbon results in the formation of unwanted by-products.

Chief among these by-products are acetylene and carbon dioxide. Acetylene is unacceptable for two reasons. Firstly, vinyl chloride monomer contaminated with acetylene will produce unacceptable polyvinylchloride since the properties of polyvinylchloride are inferior when contaminated with acetylene. Secondly, the adsorptive capacity of carbon decreases because of the deposition of chlorinated organics which is an inevitable consequence of the formation of acetylene. The reduction in capacity is both troublesome and inefficient since the more VCM the carbon can adsorb before regeneration, the more efficient the process will become. In addition, chlorinated organics other than VCM are usually more difficult to remove from carbon and thus tend to increase in concentration and further decrease the capacity of the bed.

Secondly, the production of carbon dioxide is unacceptable since carbon dioxide is formed from carbon of the bed itself which tends to consume and degrade said carbon necessitating earlier replacement than otherwise desired. In addition, the reaction forming carbon dioxide generates unwanted heat which requires both cooling of the bed to keep down exotherms, and to prevent high temperatures which allow the VCM to polymerize in the bed, further clogging the adsorptive capacity of the bed.

Many patents disclose the use of hydroquinone to prolong the life of carbon. Among these are U.S. Pat. No. 3,796,023, German Offenlegungsschrift No. 2,148,954, and French Demande No. 2,156,496. However, hydroquinone is not as efficient as the process of the instant invention in preventing ethylene formation, does not prevent $CO_2$ formation and is in any event, more costly.

It would therefore be of great benefit to provide a method for preventing the formation of ethylene and carbon dioxide during the adsorption of VCM from air streams contaminated with said VCM. It would also be of benefit to provide a more economical and permanent means for the prevention of such reactions.

It is therefore an object of the present invention to provide a method for the prevention of ethylene and carbon dioxide formation during the adsorption of VCM on carbon. Other objects will become apparent to those skilled in this art as the description proceeds.

It has now been discovered in accordance with the present invention that the formation of acetylene and carbon dioxide during the adsorption of VCM on carbon can be prevented by impregnating said carbon prior to adsorption with a nitrite-containing material. It appears that the nitrite is the effective portion of the material and that any nitrite derived from alkali metal nitrites, and alkaline earth nitrites is effective in the process of the instant invention.

Representative examples of such nitrites are lithium nitrite, sodium nitrite, potassium nitrite, magnesium nitrite, calcium nitrite, strontium nitrite, and barium nitrite.

The practice of the present invention is extremely simple and requires no maintenance once the initial impregnation is accomplished. Basically, the impregnation is accomplished by simply soaking the carbon with water containing the desired amount of the nitrite material followed by removing the water at sufficiently high temperature, normally 90°–105° C, by evaporation. Once accomplished, the impregnation is permanent and is not decreased by regeneration techniques common to the art such as by steam stripping. The adsorptive capacity of the carbon is essentially unchanged when nitrite is present.

Nitrite concentrations in the practice of the instant invention normally will be from about 0.1% by weight to about 10% by weight of the carbon as a whole. However for practical purposes and to reduce the absorptive capacity of the carbon bed as little as possible from 0.2% by weight to about 5% by weight are preferred. Normally from about 0.5% by weight to about 2% by weight are most preferred.

The invention is more concretely described with reference to the examples below wherein all parts and percentages are by weight unless otherwise specified. It is emphasized that the examples are intended to exemplify the present invention and are not to be construed to limit it.

Laboratory scale experiments were carried out on the instant invention. The carbon used for adsorption was Calgon active carbon, PCB 12×30 having the following commercial properties: total surface area 1,150 to 1,250 square meters per gram, an apparent density of 0.44 grams per cubic centimeter, and about 50% voids in a dense-packed column.

The laboratory experiments were carried out in a stainless tube 1 inch in diameter and 20 inches long. The tube was used as a reactor and an absorption tower.

Acetylene was identified by gas chromatograph retention time and a mass spectrometric analysis of a gas chromatograph peak. Carbon dioxide was determined with a Dragger tube. Flowrates reported are the values at room temperature and atmospheric pressure.

EXAMPLE 1

The concentration of acetylene in VCM after passing uncontaminated VCM through a carbon bed maintained at 100° C are summarized in Table 1. At this temperature the rate of acetylene formation is found to be an average of 1.23 micromoles per minute at 1 atmosphere VCM pressure and with 100 grams of carbon.

TABLE 1

The formation of acetylene in the reaction of vinyl chloride with active carbon at 100° C. Feed, 100% vinyl chloride at one atmosphere; carbon, 100 g.

| FLOW RATE (cc/min) | ACETYLENE (%) | RATE (Micro-mole/min) |
|---|---|---|
| 50 | 0.0613 | 1.28 |
| 100 | 0.0275 | 1.15 |
| 200 | 0.0144 | 1.20 |
| 400 | 0.00766 | 1.28 |
| | Avg. | 1.23 |

This example thus conclusively demonstrates the presence of undesirable acetylene in VCM passing through a carbon bed.

EXAMPLE 2

The dependence of the rate of acetylene formation on temperature is shown in Table 2. Using least squares method the rate constant in micromoles per minute at atmospheric VCM pressure with 100g of carbon was estimated as $k = 1.35 \times 10^9 \exp(-15.61 \times 10^3/RT)$. The results set forth in Table 2 clearly show that acetylene is formed in absorptive recovery.

TABLE 2

The formation of acetylene in the reaction with active carbon at various temperatures.
Feed, 100% vinyl chloride at one atmosphere; carbon, 100 g.

| TEMP. (° C) | FLOW RATE (cc/min) | ACETYLENE (%) | RATE (Micro-mole/min) |
|---|---|---|---|
| 50 | 50 | 0.00239 | 0.050 |
| 75 | 50 | 0.00629 | 0.13 |
| 100 | 50 | 0.0613 | 1.28 |
| 125 | 400 | 0.0160 | 2.67 |
| 150 | 400 | 0.0901 | 15.0 |

The data in Table 2 regarding the formation of acetylene in the reaction of vinyl chloride with active carbon at various temperatures was determined for a 100% vinyl chloride feed at one atmosphere over 100g of carbon.

EXAMPLE 3

The rate of formation of acetylene does not depend linearly upon the VCM concentration. The rate of formation is strongly inhibited by the presence of water vapor in the feed. Also when the feed VCM is contaminated with air carbon dioxide is produced. Whereas water vapor decreases the amount of acetylene formed, water vapor accelerates carbon dioxide formations. These conclusions are clearly shown by the data given in Table 3 wherein acetylene is shown as micromoles per minute and carbon dioxide is shown as micromoles per minute produced. Thus Table 3 shows the effect of vinyl chloride concentration and water vapor on a formation of acetylene and carbon dioxide at various temperatures.

TABLE 3

| FEED | ACETYLENE (MICROMOLE/MIN) | | | $CO_2$ (MICROMOLE/MIN) | | |
|---|---|---|---|---|---|---|
| | 100° C | 150° C | 200° C | 100° C | 150° C | 200° C |
| 100% VCM | 1.23 | 15.0 | — | — | — | — |
| 100% VCM Saturated With Water at Room Temp. | 0.071 | — | — | — | — | — |
| 10% VCM, 1% $O_2$ in $N_2$ | 0.44 | 8.9 | 41.2 | — | 0.83 | 2.5 |
| 10% VCM, 1% $O_2$ in $N_2$ Saturated With Water At Room Temp. | 0.12 | 1.6 | 8.0 | 0.83 | 3.3 | 3.3 |

Example 4 shows the method used to impregnate carbon with nitrite compound.

EXAMPLE 4

The impregnated carbon is produced by soaking 100g of carbon with 200g of water having dissolved therein 2g of nitrite-containing compound (sodium nitrite) and then removing water at temperatures of form about 90° to about 105° C by evaporation. Once dried, the carbon was used in place of the non-impregnated carbon in the following experiments.

The effect of hydroquinone and sodium nitrite impregnation on the formation of acetylene and carbon dioxide at various temperatures was examined. A feed of 10% vinyl chloride monomer and 1% oxygen in nitrogen passed over a water vapor saturator at room temperature was used. The data shown in Table 4 demonstrates that impregnation with a nitrite compound drastically reduces acetylene formation. The data also shows that sodium nitrite is more effective than hydroquinone (HQ). In addition, sodium nitrite reduces carbon dioxide formation while hydroquinone does not do so.

TABLE 4

| Carbon | ACETYLENE (H mole/min) | | | | |
|---|---|---|---|---|---|
| | 50° C | 100° C | 150° C | 200° C | 250° C |
| No Impreg. | 0.0 | 0.12 | 1.6 | 8.0 | — |
| HQ at 2% | 0.0 | 0.0 | 0.22 | 1.3 | 6.3 |
| $NaNO_2$ at 2% | 0.0 | 0.0 | 0.07 | 0.7 | 6.3 |

| | $CO_2$ (H mole/min) | | | |
|---|---|---|---|---|
| | 100° C | 150°C | 200° C | 250° C |
| No Impreg. | 0.8 | 3.3 | 3.3 | — |
| HQ at 2% | 1.7 | 3.3 | 10. | 25 |
| $NaNO_2$ at 2% | 0.0 | 0.0 | 1.7 | 8.3 |

EXAMPLE 5

The loading capacity of VCM on carbon prior to impregnation and after impregnation with nitrite is determined using the standard breakthrough curve method well known to those skilled in this art, such as described in Mantell, C. L., Adsorption, McGraw-Hill, New York, London (1951). The following conditions were used in the determination. A feed of 10% VCM, 1% oxygen in air passed through a water vapor saturator at room temperature at 400 cubic centimeters (cc) per minute at an adsorption temperature of between 50° and 65° C. The capacities of the two carbons were 0.297 lbs. of VCM per pound of carbon for the non-impregnated carbon and 0.281 lbs. of VCM per pound of carbon for the sodium nitrite impregnated carbon. Clearly this small difference can be due to experimental error and in any event, shows that the adsorption capabilities of both carbons are essentially equal.

The invention previously described was more completely examined in a pilot scale work. The carbon used in the following experiments was Calgon activated carbon, PCB 12×30. The adsorber was a 6-inch Sch 40 carbon steel pipe 16 inches long loaded with 12 inches of carbon. Acetylene was identified by retention time using a Carle flame ionization gas chromatograph. The adsorption of VCM in nitrogen was carried out over a wet carbon bed resulting from regeneration with super heated steam.

EXAMPLE 6

The deposition of chlorinated organics on the unimpregnated carbon was demonstrated by chlorine analysis of the carbon after 12 adsorption cycles above 100° C. The carbon contained 1.6 weight percent chlorine based upon the total weight of the bed.

EXAMPLE 7

The maximum concentration of acetylene after passing through the carbon bed described above using a feed of 40 volume percent VCM in nitrogen at 25°-30° C was determined. Acetylene was present in the feed at 10 ppmv. The data of the experiment is shown in Table 5 which clearly shows that sodium nitrite effectively limited the reaction of VCM to acetylene. The data in the table was generated using comparable runs using both impregnated and non-impregnated carbons.

TABLE 5

| Maximum Bed Temperature | ACETYLENE CONCENTRATION (PPMV) | | | |
|---|---|---|---|---|
| | 100° C | 125° C | 150° C | 200° C |
| No Impregnation | 600–900 | — | 2700 | 25600 |
| NaNO$_2$ at 2% | 100–150 | 200 | — | — |

EXAMPLE 8

The loading capacity of VCM on wet carbon was determined by gas volume measurement of VCM during desorption. The adsorption of the VCM was accomplished under conditions of 40 volume percent VCM and 60 volume percent nitrogen at 25°-30° C at a feed rate of 15 standard cubic per hour and a maximum adsorption temperature of 100° C. Capacities of the beds, both impregnated and nonimpregnated, show that the nonimpregnated bed adsorbed 0.19 to 0.23 lbs. of VCM per pound of carbon whereas the sodium nitrite impregnated bed is adsorbed from 0.19 to 0.25 lbs. of VCM per pound of carbon. Thus, no significant change in loading was observed. The loadings are less than those of the laboratory example (Example 5) because of the lower VCM adsorptive capacity of wet carbon vs. the dry carbon used in the laboratory example.

EXAMPLE 9

The impregnated carbon is produced by soaking 100g of carbon with 200 g of water having dissolved therein 2g of calcium nitrite. The results are similar to the ones summarized in Table 4 with NaNO$_2$ impregnation.

Preparation of an alkaline earth nitrite is shown in Example 9.

While certain embodiments and details have been shown for the purpose of illustrating this invention, it will be apparent to those skilled in this art that various changes and modifications may be made herein without departing from the spirit or the scope of the invention.

We claim:

1. A method for reducing formation of acetylene and carbon dioxide formed during the carbon adsorption of VCM from air streams containing said VCM comprising impregnating carbon to be used for VCM adsorption with at least one nitrite compound selected from the group consisting of alkali metal nitrites, and alkaline earth nitrites.

2. A method as described in claim 1 wherein the nitrite compound is present in the carbon in an amount of from about .1 weight percent to about 10 weight percent based upon the total weight of the carbon.

3. A method as described in claim 2 wherein the nitrite compound is selected from the group consisting of sodium nitrite, potassium nitrite, lithium nitrite, ammonium nitrite, calcium nitrite, strontium nitrite, and barium nitrite.

4. A method as described in claim 3 wherein the nitrite compound is selected from the group consisting of sodium nitrite and potassium nitrite.

5. A method as described in claim 1 wherein the nitrite impregnated carbon is regenerated by steam stripping, dried, and reused for VCM adsorption.

* * * * *